United States Patent
Kowase

(10) Patent No.: US 11,145,458 B2
(45) Date of Patent: Oct. 12, 2021

(54) MULTI-LAYER CERAMIC ELECTRONIC COMPONENT

(71) Applicant: Taiyo Yuden Co., Ltd., Tokyo (JP)

(72) Inventor: Yusuke Kowase, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 16/279,581

(22) Filed: Feb. 19, 2019

(65) Prior Publication Data

US 2019/0259535 A1    Aug. 22, 2019

(30) Foreign Application Priority Data

Feb. 22, 2018   (JP) .............................. JP2018-029455
Nov. 26, 2018   (JP) .............................. JP2018-219930

(51) Int. Cl.
*H01G 4/012*    (2006.01)
*H01G 4/228*    (2006.01)
*H01G 4/30*     (2006.01)
*H01G 4/12*     (2006.01)

(52) U.S. Cl.
CPC .......... *H01G 4/012* (2013.01); *H01G 4/1209* (2013.01); *H01G 4/228* (2013.01); *H01G 4/306* (2013.01)

(58) Field of Classification Search
CPC ........ H01G 4/30; H01G 4/012; H01G 4/1227; H01G 4/2325; H01G 4/1209; H01G 4/228; H01G 4/306
See application file for complete search history.

(56) References Cited

U.S. PATENT DOCUMENTS

| | | |
|---|---|---|
| 2013/0305069 A1 | 11/2013 | Goda |
| 2014/0254063 A1* | 9/2014 | Konishi ............... H01G 4/1245 361/301.4 |
| 2016/0003737 A1 | 1/2016 | Shimada |
| 2016/0329151 A1* | 11/2016 | Ishida ................. H01G 4/1227 |
| 2017/0018363 A1* | 1/2017 | Tanaka .................. H01G 4/232 |
| 2018/0240598 A1 | 8/2018 | Tanaka et al. |
| 2019/0096586 A1 | 3/2019 | Tanaka et al. |
| 2019/0103226 A1 | 4/2019 | Tanaka et al. |
| 2019/0189353 A1 | 6/2019 | Tanaka et al. |
| 2019/0189354 A1 | 6/2019 | Tanaka et al. |
| 2019/0189355 A1 | 6/2019 | Tanaka et al. |
| 2019/0189356 A1 | 6/2019 | Tanaka et al. |
| 2020/0020483 A1 | 1/2020 | Tanaka et al. |

(Continued)

FOREIGN PATENT DOCUMENTS

| | | |
|---|---|---|
| CN | 103718260 A | 4/2014 |
| CN | 105849836 A | 8/2016 |

(Continued)

OTHER PUBLICATIONS

Office Action dated Jul. 1, 2021 in Chinese Application No. 201910132140.7, along with its English translation.

*Primary Examiner* — Michael P McFadden
(74) *Attorney, Agent, or Firm* — Saliwanchik, Lloyd & Eisenschenk

(57) ABSTRACT

A multi-layer ceramic electronic component includes a plurality of layered internal electrodes and a first crystal grain. The plurality of layered internal electrodes are disposed at intervals in a first direction and each include a pore. The first crystal grain has a larger diameter in the first direction than the interval and has a part disposed in the pore.

8 Claims, 11 Drawing Sheets

(56) References Cited

U.S. PATENT DOCUMENTS

| | | |
|---|---|---|
| 2020/0185154 A1 | 6/2020 | Tanaka et al. |
| 2020/0266000 A1 | 8/2020 | Tanaka et al. |
| 2020/0266001 A1 | 8/2020 | Tanaka et al. |
| 2021/0202182 A1 | 7/2021 | Tanaka et al. |

FOREIGN PATENT DOCUMENTS

| | | |
|---|---|---|
| CN | 106356189 A | 1/2017 |
| JP | 2012-94819 A | 5/2012 |

* cited by examiner

MULTI-LAYER CERAMIC ELECTRONIC COMPONENT

CROSS-REFERENCE TO RELATED APPLICATIONS

This application claims the benefit under 35 U.S.C. § 119 of Japanese Application Nos. 2018-029455, filed Feb. 22, 2018; and 2018-219930, filed Nov. 26, 2018; both of which are hereby incorporated by reference in their entirety.

BACKGROUND

The present disclosure relates to a multi-layer ceramic electronic component such as a multi-layer ceramic capacitor.

Japanese Patent Application Laid-open No. 2012-94819 discloses a technique of providing side margins of a multi-layer ceramic capacitor in a later step. In this technique, a multi-layer unit including internal electrodes exposed at the side surface of the multi-layer unit is formed, and side margins are provided to the side surfaces of the multi-layer unit. This technique allows the side margins to be thinned and is thus advantageous to the reduction in size and the increase in capacitance of a multi-layer ceramic capacitor.

SUMMARY

As the side margin becomes thinner, the mechanical strength thereof decreases. For that reason, in a multi-layer ceramic capacitor including the thin side margins, a structural disorder is likely to occur in the vicinity of the side margins by electrostriction or the like when a high voltage is applied. Accordingly, in a multi-layer ceramic capacitor including the thin side margins, breakdown voltage characteristics are likely to be impaired.

In view of the cuircumstances as described above, it is desirable to provide a multi-layer ceramic electronic component having high mechanical strength.

According to an embodiment of the present disclosure, there is provided a multi-layer ceramic electronic component including a plurality of layered internal electrodes and a first crystal grain.

The plurality of layered internal electrodes are disposed at intervals in a first direction and each include a pore.

The first crystal grain has a larger diameter in the first direction than the interval and has a part disposed in the pore.

The pore may include a pore including a void forming a space that is not filled with the crystal grain.

This multi-layer ceramic electronic component has a configuration in which the first crystal grain grows in the first direction and enters the pore of the internal electrode. In other words, since at least a part of the pore of the internal electrode is filled with ceramics, a high-density multi-layer ceramic electronic component is obtained. With this configuration, high mechanical strength is obtained in the multi-layer ceramic electronic component.

The plurality of layered internal electrodes may include a first layer, and a pair of second layers that are adjacent to both sides of the first layer in the first direction and are connected to each other by two crystal grains including the first crystal grain disposed in the pore of the first layer.

In this multi-layer ceramic electronic component, the second layers facing each other while sandwiching the first layer therebetween out of the plurality of layered internal electrodes are connected to each other by two crystal grains including the first crystal grain disposed in the pore of the first layer. With this configuration, the second layers of the plurality of layered internal electrodes are connected to each other in a lamination direction by only the crystal grains of ceramics. Thus, damage such as delamination is less likely to occur.

The first crystal grain may have a diameter in the first direction that is smaller than twice the interval.

In this configuration, when sintering is performed under a condition that the excessive grain growth of the first crystal grain is inhibited, the internal electrodes can be inhibited from being unfavorably deformed such as being spheroidized.

The multi-layer ceramic electronic component may further include a second crystal grain that directly connects two layers adjacent to each other in the first direction out of the plurality of layered internal electrodes.

The multi-layer ceramic electronic component may further include a side margin that covers the plurality of layered internal electrodes in a second direction orthogonal to the first direction and has a dimension in the second direction that is equal to or smaller than 25 µm.

In this configuration, when the side margin is made thin, it is possible to enlarge an area where the internal electrodes can be formed.

The interval may be equal to or smaller than 500 nm.

The plurality of layered internal electrodes may each have a dimension in the first direction that is equal to or smaller than 500 nm.

In this configuration, when ceramic layers and the internal electrodes are made thin, it is possible to increase the lamination number of ceramic layers and internal electrodes.

As described above, according to the present disclosure, it is possible to provide a multi-layer ceramic electronic component having high mechanical strength.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
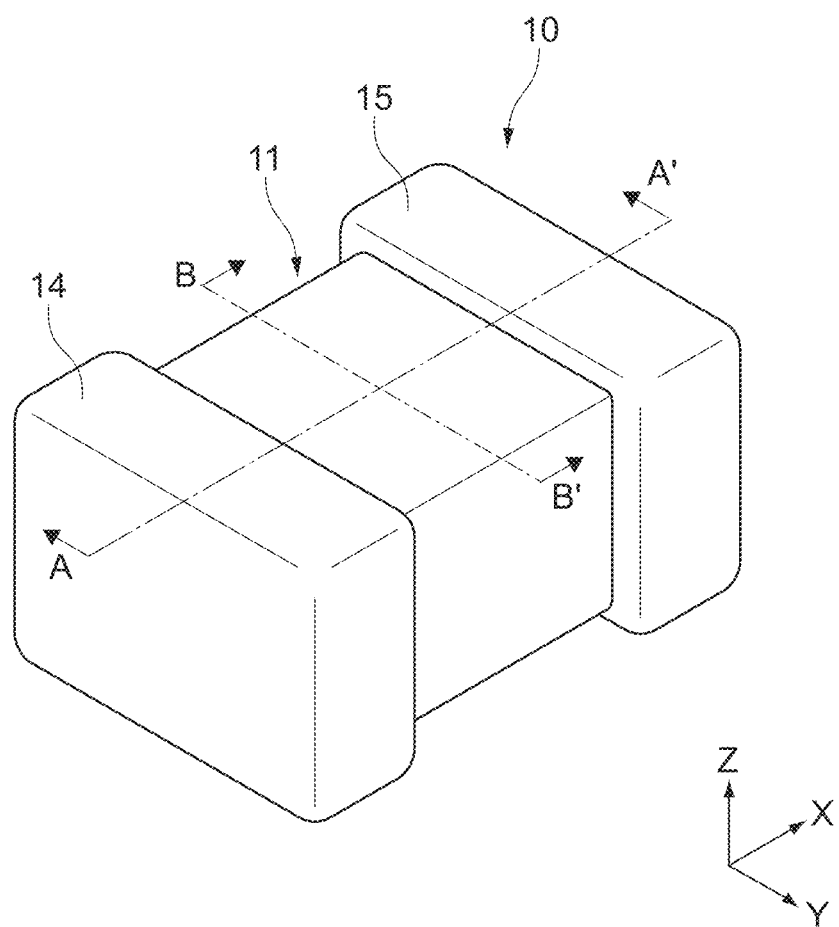
FIG. 1 is a perspective view of a multi-layer ceramic capacitor according to an embodiment of the present disclosure.
Figure 2:
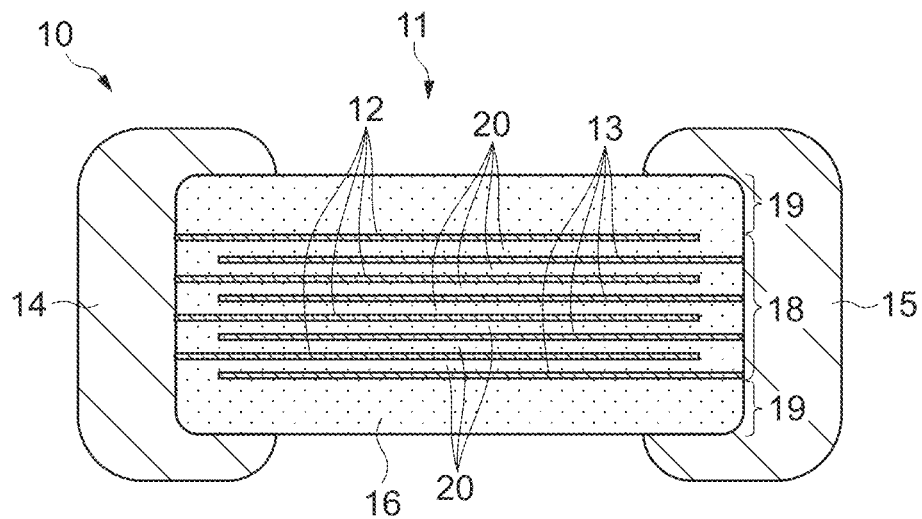
FIG. 2 is a cross-sectional view of the multi-layer ceramic capacitor taken along the A-A' line in FIG. 1.
Figure 3:
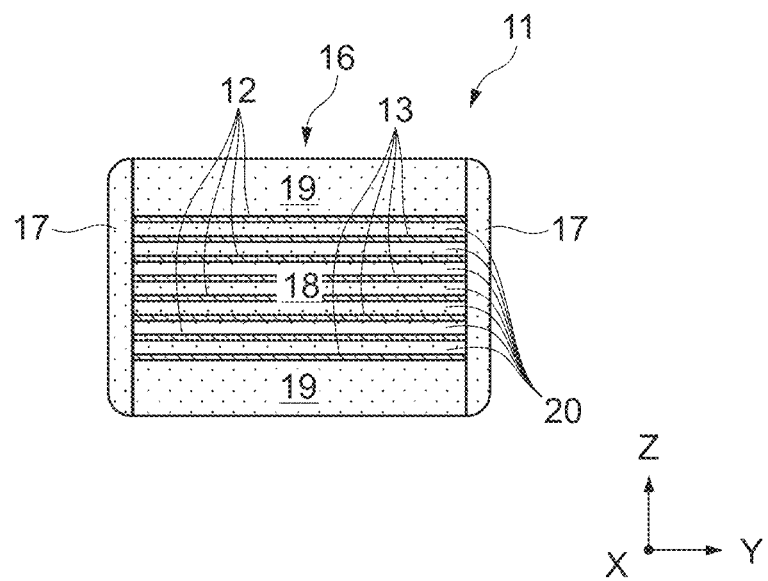
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 is formed as a hexahedron having two main surfaces facing in the Z-axis direction, two side surfaces facing in the Y-axis direction, and two end surfaces facing in the X-axis direction.

It should be noted that the shape of the ceramic body 11 is not limited to the shape as described above. In other words, the ceramic body 11 does not need to have the rectangular shape as shown in FIGS. 1 to 3. For example, the surfaces of the ceramic body 11 may be curved surfaces, and the ceramic body 11 may be rounded as a whole.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each made of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is made of dielectric ceramics and includes a multi-layer unit 16 and side margins 17. The multi-layer unit 16 has two side surfaces facing in the Y-axis direction and has a configuration in which a plurality of flat plate-like ceramic layers 20 extending along the X-Y plane are laminated in the Z-axis direction. The side margins 17 are formed on both the side surfaces of the multi-layer unit 16.

The multi-layer unit 16 includes a capacitance forming unit 18 and covers 19. The capacitance forming unit 18 includes a plurality of layers of first internal electrodes 12 and second internal electrodes 13, which are covered with dielectric ceramics. The capacitance forming unit 18 is covered with the covers 19 vertically in the Z-axis direction. The first and second internal electrodes 12 and 13 each have a sheet-like shape extending along the X-Y plane. The first and second internal electrodes 12 and 13 are alternately disposed along the Z-axis direction.

In other words, the first internal electrode 12 and the second internal electrode 13 face each other in the Z-axis direction while sandwiching a ceramic layer 20 therebetween. The first internal electrodes 12 are drawn to one of the end surfaces of the ceramic body 11 and connected to the first external electrode 14. The second internal electrodes 13 are drawn to the other one of the end surfaces of the ceramic body 11 and connected to the second external electrode 15.

With the configuration described above, when a voltage is applied between the first external electrode 14 and the second external electrode 15 in the multi-layer ceramic capacitor 10, the voltage is applied to the ceramic layers 20 between the first internal electrodes 12 and the second internal electrodes 13. This allows the multi-layer ceramic capacitor 10 to store charge corresponding to the voltage applied between the first external electrode 14 and the second external electrode 15.

Further, the surfaces of the capacitance forming unit 18, except both the end surfaces, which face in the X-axis direction and to which the first external electrode 14 and the second external electrode 15 are provided, are covered with the side margins 17 and the covers 19. Therefore, in the capacitance forming unit 18, the side margins 17 and the covers 19 protect the periphery of the capacitance forming unit 18 and ensure insulation properties of the first internal electrodes 12 and the second internal electrodes 13.

In the ceramic body 11, in order to increase electrostatic capacitances of the respective ceramic layers 20 provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layers 20 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each made of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It is favorable that the multi-layer ceramic capacitor 10 has a configuration advantageous to the reduction in size and the increase in capacitance. Specifically, in the multi-layer ceramic capacitor 10, it is favorable that the side margin 17, which does not contribute to the formation of the electrostatic capacitance in the ceramic body 11, has a small thickness (dimension in the Y-axis direction).

More specifically, when the thickness of the side margin 17 is set to be small, a proportion of the capacitance forming unit 18 that contributes to the formation of the electrostatic capacitance in the ceramic body 11 increases, which is advantageous to the reduction in size and the increase in capacitance of the multi-layer ceramic capacitor 10. It is favorable that the thickness of the side margin 17 is set to be equal to or smaller than 25 μm.

For example, the thickness of the side margin 17 can be measured at the center portion in the Z-axis direction on the cross section parallel to the Y-Z plane at the center portion of the ceramic body 11 in the X-axis direction. In order to reduce the thickness of the side margin 17, a technique of providing the side margins 17 to the multi-layer unit 16 in a later step is effective.

In other words, the side margins 17 are formed as separate components from the multi-layer unit 16, and thus insulation properties of the capacitance forming unit 18 can be reliably ensured by also the thin side margins 17. It should be noted that the details of the technique of providing the side margins 17 in a later step will be described later in the section of "Method of Producing Multi-layer Ceramic Capacitor 10".

Further, in the multi-layer ceramic capacitor 10, it is favorable that the thickness of the ceramic layer 20 (dimension in the Z-axis direction), that is, the interval between the first internal electrode 12 and the second internal electrode 13 in the Z-axis direction is formed to be small. Moreover, in the multi-layer ceramic capacitor 10, it is favorable that the thickness of each of the first and second internal electrodes 12 and 13 (dimension in the Z-axis direction) is also formed to be small.

More specifically, when the thickness of each of the ceramic layers 20 and first and second internal electrodes 12 and 13 is made to be small, the lamination number of ceramic layers 20 and first and second internal electrodes 12 and 13 can be increased. This will be advantageous to the reduction in size and the increase in capacitance of the multi-layer ceramic capacitor 10. It is favorable that the thickness of each of the ceramic layers 20 and first and second internal electrodes 12 and 13 is set to be equal to or smaller than 500 nm.

The thickness of each of the ceramic layers 20 and first and second internal electrodes 12 and 13 can be calculated as a mean value of the thicknesses measured at a plurality of sites of the cross section of the capacitance forming unit 18. The position at which the thickness of each of the ceramic layers 20 and first and second internal electrodes 12 and 13 is to be measured or the number of positions may be optionally determined. Hereinafter, an example of a method of measuring the thickness of each of the ceramic layers 20 and first and second internal electrodes 12 and 13 will be described.

Figure 4:
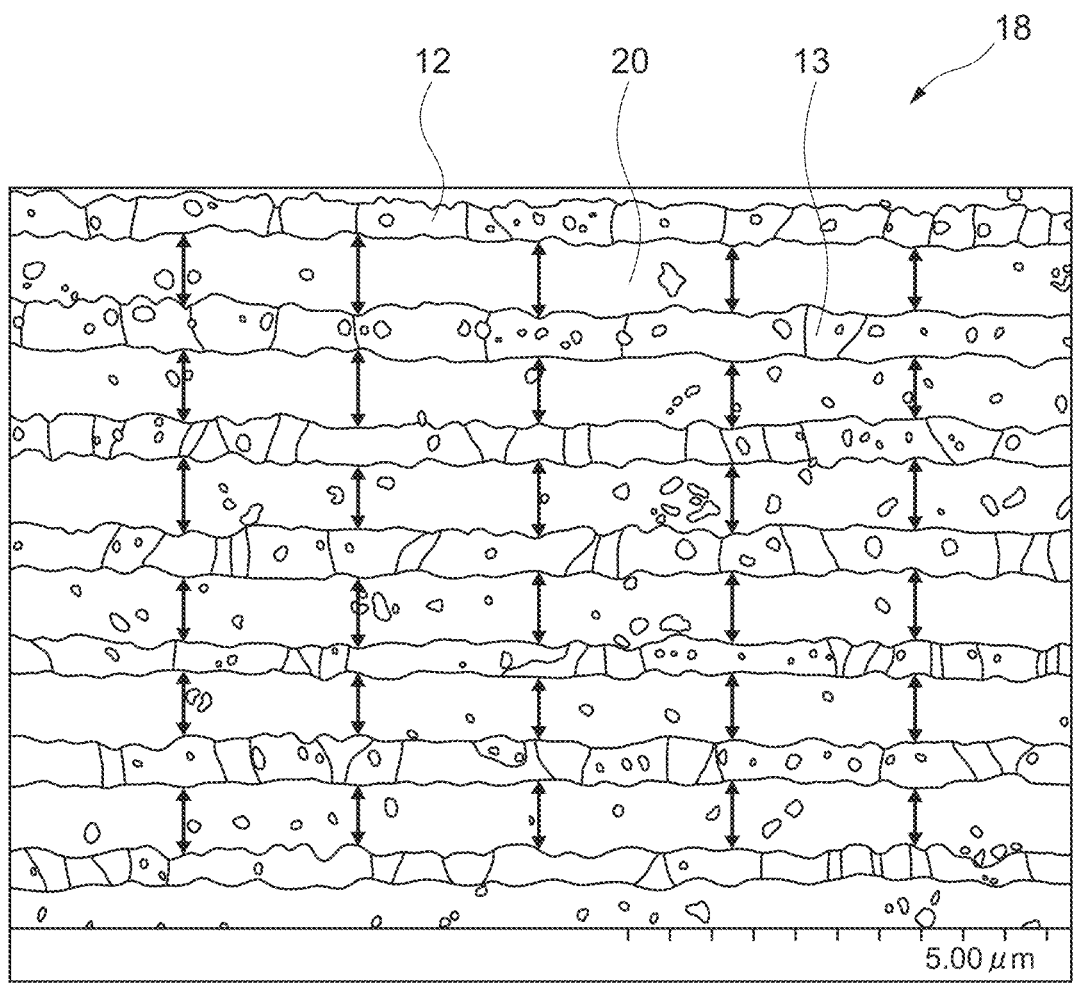
FIG. 4 is a partial cross-sectional view schematically showing a microstructure of a capacitance forming unit of the multi-layer ceramic capacitor.

FIG. 4 is a diagram showing a microstructure of a cross section of the capacitance forming unit 18, which is observed in the visual field of 12.6 μm×8.35 μm with a scanning electron microscope (SEM). For each of the six ceramic layers 20 within the visual field, the thickness is measured at five sites indicated by the arrows arranged at equal intervals of 2 μm. Subsequently, a mean value of the thicknesses obtained at the 30 sites can be set as the thickness of the ceramic layer 20.

As with the case of the thickness of the ceramic layer 20, the thickness of each of the first internal electrodes 12 and the second internal electrodes 13 can also be measured from the microstructure of the cross section of the ceramic body 11 shown in FIG. 4. For example, a mean value of the thicknesses obtained at the 30 sites, which are adjacent to the arrows shown in FIG. 4 on the lower side thereof in the Z-axis direction, can be obtained as the thickness of each of the first and second internal electrodes 12 and 13.

2. Microstructure of Ceramic Body 11

Figure 5:
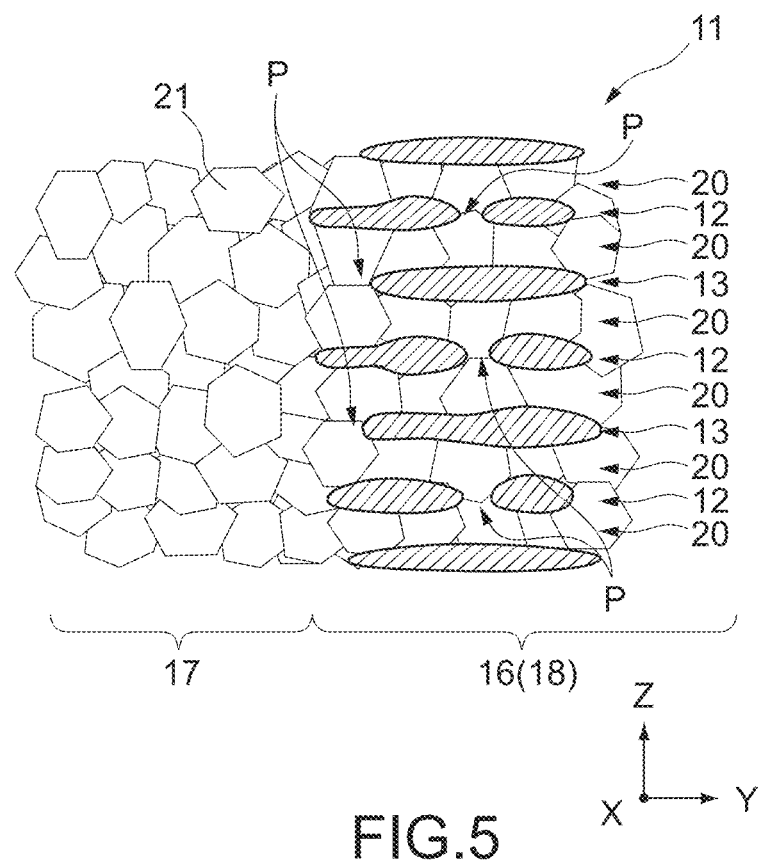
FIG. 5 is a partial cross-sectional view schematically showing a microstructure in the vicinity of a boundary portion between a multi-layer unit and a side margin of the multi-layer ceramic capacitor.

FIG. 5 is a partial cross-sectional view schematically showing a microstructure in the vicinity of a boundary portion between the multi-layer unit 16 and the side margin 17 in the ceramic body 11. The side margin 17 and the ceramic layer 20 are polycrystal made of crystal grains 21 of ceramics. The first internal electrodes 12 and the second internal electrodes 13 include pores P, each of which is a through-hole that penetrates in the Z-axis direction.

The pores P are dispersed over the entire first internal electrodes 12 and second internal electrodes 13. Typically, the pores P are formed when the first and second internal electrodes 12 and 13 made of metal shrink more largely than the ceramic layers 20 made of ceramics at the time of sintering of the ceramic body 11. The pores P of the first and second internal electrodes 12 and 13 are more likely to occur as the thickness of each of the first and second internal electrodes 12 and 13 becomes smaller.

Figure 6:
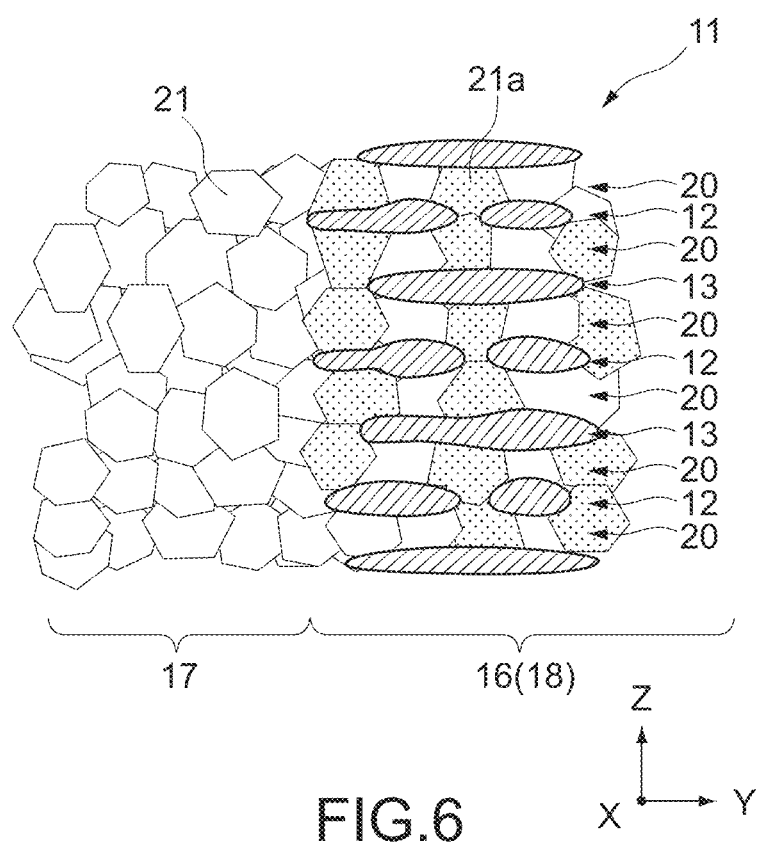
FIG. 6 is a partial cross-sectional view schematically showing the microstructure in the vicinity of the boundary portion between the multi-layer unit and the side margin of the multi-layer ceramic capacitor.

The crystal grains 21 forming the ceramic layer 20 include first crystal grains 21a, each of which is indicated by a dot pattern in FIG. 6. Part of the first crystal grain 21a is disposed within the pore P of the first internal electrode 12 or the second internal electrode 13. Further, the diameter (maximum dimension) of the first crystal grain 21a in the Z-axis direction is larger than the thickness of the ceramic layer 20.

The first crystal grains 21a are formed typically when the ceramic grains existing in the vicinity of the pores P of the first internal electrodes 12 and the second internal electrodes 13 enter the pores P of the first internal electrodes 12 and the second internal electrodes 13 due to the grain growth in the Z-axis direction at the time of sintering of the ceramic body 11. Accordingly, the first crystal grains 21a include a crystal grain that is long in the Z-axis direction.

In the multi-layer ceramic capacitor 10, at least part of the pores P of the first internal electrodes 12 and the second internal electrodes 13 is blocked by the first crystal grains 21a, and thus the density of the ceramic body 11 increases. With this configuration, in the multi-layer ceramic capacitor 10, high mechanical strength is obtained, and a structural disorder is less likely to occur.

Further, it is favorable that a pair of first internal electrodes 12 adjacent in the Z-axis direction are connected to each other without gaps therebetween in the Z-axis direction by the crystal grains 21 via the pore P of the second internal electrode 13 disposed between the first internal electrodes 12. Similarly, it is favorable that a pair of second internal electrodes 13 adjacent in the Z-axis direction are also connected to each other without gaps therebetween in the Z-axis direction by the crystal grains 21 via the pore P of the first internal electrode 12 disposed between the second internal electrodes 13.

In other words, it is favorable that, via a pore P of a first layer that is one of the first internal electrode 12 and the second internal electrode 13, a pair of second layers, which are the other of the first internal electrodes 12 and the second internal electrodes 13 adjacent in the Z-axis direction, are connected to each other by only the crystal grains 21 of ceramics in the Z-axis direction while sandwiching the first layer therebetween. With this configuration, the mechanical strength between the first internal electrodes 12 and the mechanical strength between the second internal electrodes 13 are improved.

In particular, the number of crystal grains 21 that connects the first internal electrodes 12 and connects the second internal electrodes 13 is favorably small, and more favorably, two including the first crystal grain 21a. With this configuration, it is possible to suppress the number of connection interfaces between the crystal grains 21 to be small, and thus the mechanical strength between the first internal electrodes 12 and the mechanical strength between the second internal electrodes 13 are improved.

With such a configuration, damage such as delamination is less likely to occur in the multi-layer ceramic capacitor 10, and thus higher mechanical strength is obtained. It should be noted that connecting the first internal electrodes 12 to each other and the second internal electrodes 13 to each other by the single first crystal grain 21a is not favorable in terms of the necessity of excessive grain growth, the details of which will be described later.

Further, in the multi-layer ceramic capacitor 10, as the thickness of the side margin 17 becomes smaller, the mechanical strength of the side margin 17 becomes lower. Accordingly, in the vicinity of the side margin 17 in the ceramic body 11, a structural disorder is likely to occur due to the stress applied by electrostriction when a high voltage is applied.

Moreover, in a case where a technique of providing the side margins 17 in a later step is used, the positions of the end portions of the first and second internal electrodes 12 and 13 in the Y-axis direction, the first and second internal electrodes 12 and 13 being exposed at the side surfaces of the multi-layer unit 16, are aligned with one another along the Z-axis direction within the range of 0.5 μm or less. Accordingly, since the stress applied by electrostriction when a high voltage is applied concentrates at the boundary portion between the multi-layer unit 16 and the side margin 17, a structural disorder is more likely to occur.

In this regard, in the multi-layer ceramic capacitor 10, an action of the first crystal grain 21a enhances the mechanical strength of the ceramic body 11. Accordingly, in the multi-layer ceramic capacitor 10, even in a case where a technique of providing the side margins 17 in a later step is used and the thickness of the side margin 17 is set to be equal to or smaller than 25 μm, a structural disorder is less likely to occur.

Further, in a case where a technique of providing the side margins 17 in a later step is used, the mechanical strength at the boundary portion between the multi-layer unit 16 and the side margin 17 is likely to be low. In particular, as the lamination number of first internal electrodes 12 and the second internal electrodes 13 becomes larger, a proportion of the metal in the multi-layer unit 16 becomes larger, and thus the mechanical strength at the boundary portion between the multi-layer unit 16 and the side margin 17 is likely to be low.

In this regard, in the multi-layer ceramic capacitor 10, the first crystal grain 21a is disposed in the pore P of the first internal electrode 12 or the second internal electrode 13 existing at the boundary portion between the multi-layer unit 16 and the side margins 17. Accordingly, a connection area between the ceramics increases at the boundary portion between the multi-layer unit 16 and the side margin 17, and thus the mechanical strength increases.

Further, it is favorable that a diameter of the first crystal grain 21a in the Z-axis direction is smaller than twice the thickness of the ceramic layer 20. In other words, it is favorable that the excessive grain growth of the first crystal grain 21a is inhibited in the Z-axis direction at the time of sintering of the ceramic body 11. When the ceramic body 11 is sintered under a condition that the excessive grain growth of the first crystal grain 21a is allowed in the Z-axis direction, the following problem occurs.

The first internal electrodes 12 and the second internal electrodes 13, sintering temperature of which is lower than that of the ceramic body 11, are easily accelerated to be spheroidized by over-sintering. As the first internal electrodes 12 and the second internal electrodes 13 are more accelerated to be spheroidized, each pore P becomes larger and the thickness thereof increases. Further, the first crystal grain 21a may push out the pore P of the first internal electrode 12 or second internal electrode 13 by the grain growth along the X-Y plane.

In the multi-layer ceramic capacitor 10, as the pores P, which do not contribute to the formation of the electrostatic capacitance in the first internal electrodes 12 and the second internal electrodes 13, become larger, the electrostatic capacitance becomes lower. Further, in the multi-layer ceramic capacitor 10, when the thickness of each of the first internal electrodes 12 and the second internal electrodes 13 becomes larger, a distance between the first internal electrode 12 and the second internal electrode 13 adjacent to each other in the Z-axis direction becomes shorter, and a short circuit is likely to occur.

In the multi-layer ceramic capacitor 10 according to this embodiment, when the ceramic body 11 is sintered under a condition that the excessive grain growth of the first crystal grain 21a is not caused in the Z-axis direction, the deformation of the first internal electrodes 12 and the second internal electrodes 13 as described above can be suppressed. With this configuration, in the multi-layer ceramic capacitor 10, it is possible to inhibit the electrostatic capacitance from being reduced and a short circuit from occurring.

Figure 7:
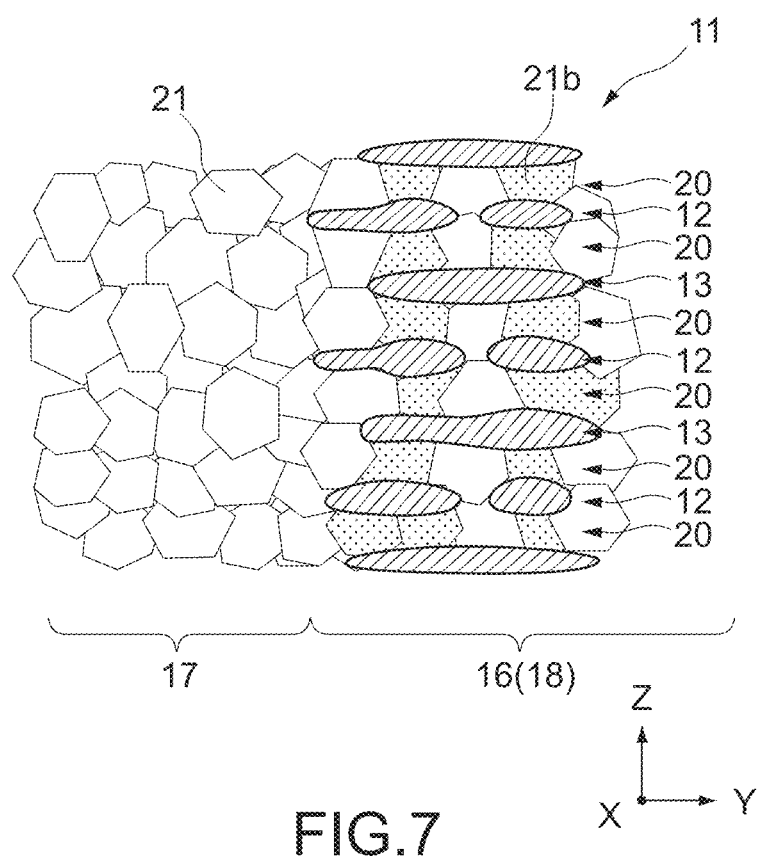
FIG. 7 is a partial cross-sectional view schematically showing the microstructure in the vicinity of the boundary portion between the multi-layer unit and the side margin of the multi-layer ceramic capacitor.

Further, the crystal grains 21 forming the ceramic layer 20 include second crystal grains 21b, each of which is indicated by a dot pattern in FIG. 7. The second crystal grain 21b is disposed between the two layers of the first internal electrode 12 and the second internal electrode 13 adjacent to each other in the Z-axis direction and directly connects the first internal electrode 12 and the second internal electrode 13 to each other without intervening with another crystal grain 21.

The second crystal grain 21b is formed when the ceramic grains existing between the first internal electrode 12 and the second internal electrode 13 undergo grain growth while being subjected to constraint of the first internal electrode 12 and the second internal electrode 13 in the Z-axis direction at the time of sintering of the ceramic body 11. Accordingly, the second crystal grains 21b include a crystal grain having a flattened shape along the X-Y plane.

In the multi-layer ceramic capacitor 10, when the ceramic body 11 is sintered under a condition that the second crystal grains 21b are formed, the first crystal grains 21a are likely to be favorably formed. It should be noted that the crystal grains 21 only need to include at least the first crystal grains 21a, and including the second crystal grains 21b is not indispensable.

Figure 8:
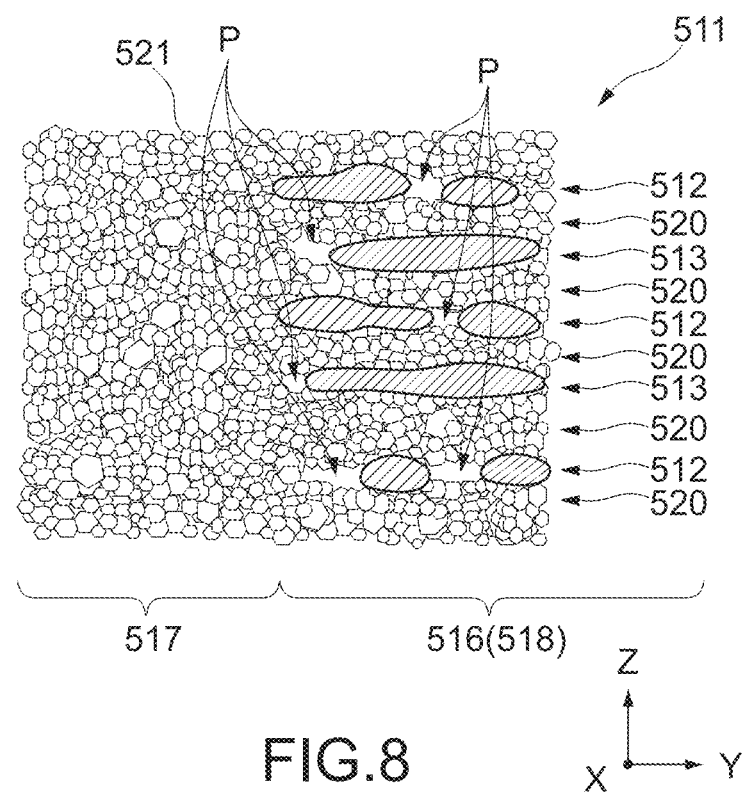
FIG. 8 is a partial cross-sectional view schematically showing a microstructure in the vicinity of a boundary portion between a multi-layer unit and a side margin of a multi-layer ceramic capacitor according to a comparative example.

FIG. 8 is a partial cross-sectional view schematically showing a microstructure in the vicinity of a boundary portion between a multi-layer unit 516 and a side margin 517 in a ceramic body 511 according to a comparative example. The side margin 517 and a ceramic layer 520 are polycrystal made of fine crystal grains 521 of ceramics.

The ceramic body 511 is sintered under a condition that the ceramic grains do not largely undergo grain growth. Accordingly, as shown in FIG. 8, even after sintering of the ceramic body 511, the pores P of internal electrodes 512 and 513 are likely to be left as spaces. Accordingly, in the ceramic body 511, the density is lowered, and sufficient mechanical strength is difficult to obtain.

Further, in a case where a technique of providing the side margins 517 in a later step is used, a connection area between the multi-layer unit 516 and the side margin 517 is reduced by the pores P of the internal electrodes 512 and 513 existing at the boundary portion between the multi-layer unit 516 and the side margin 517. With this configuration, the side margin 517 is easily peeled from the multi-layer unit 516.

Figure 9:
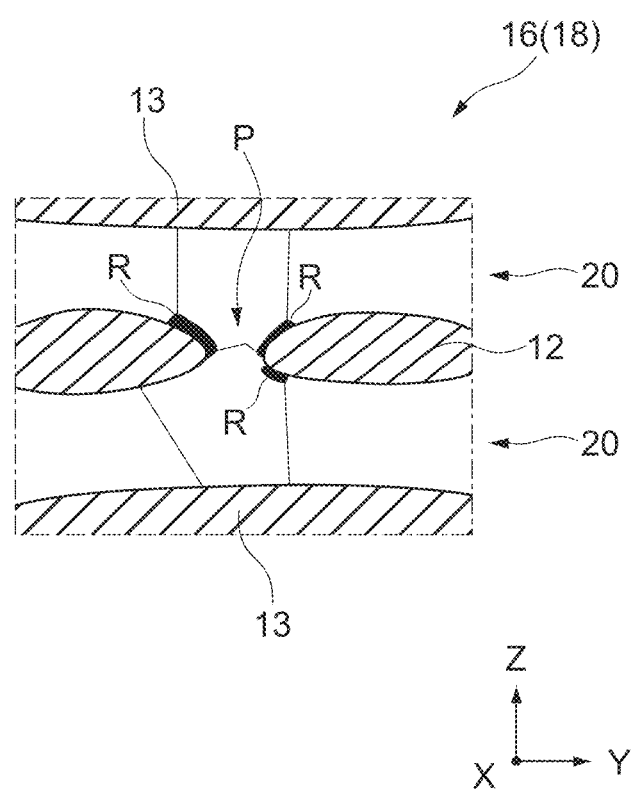
FIG. 9 is a partially enlarged cross-sectional view of a multi-layer unit of a multi-layer ceramic capacitor according to a modified example of the embodiment.

It should be noted that, in the examples shown in FIGS. 5 to 7, the pores P of the first internal electrodes 12 and the second internal electrodes 13 are filled with the crystal grains 21 without gaps. However, in the multi-layer ceramic capacitor 10, as shown in FIG. 9, the pores P of the first internal electrodes 12 and the second internal electrodes 13 may include a pore P including a void R forming a space that is not filled with the crystal grain 21.

3. Method of Producing Multi-Layer Ceramic Capacitor 10

Figure 10:
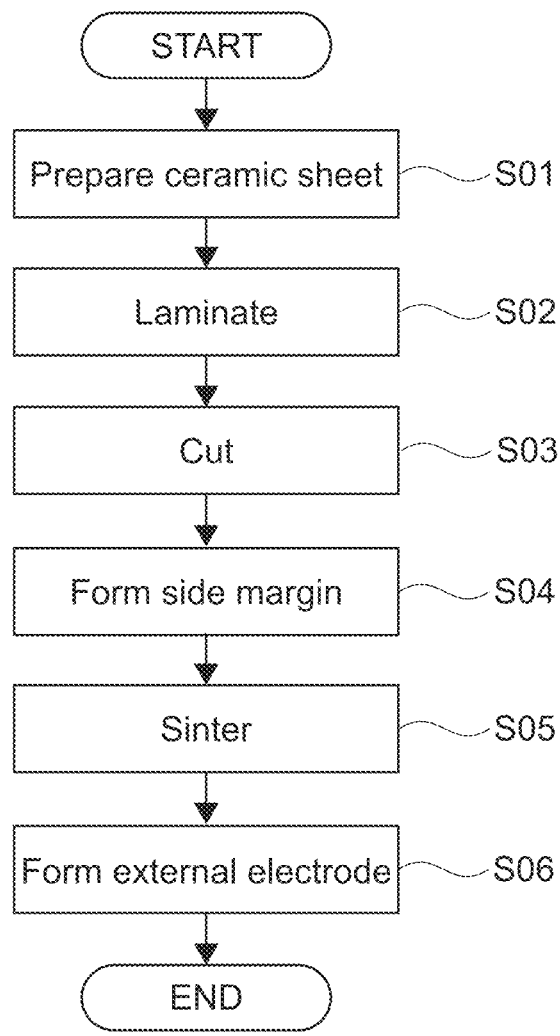
FIG. 10 is a flowchart showing a method of producing the multi-layer ceramic capacitor.
Figure 11:
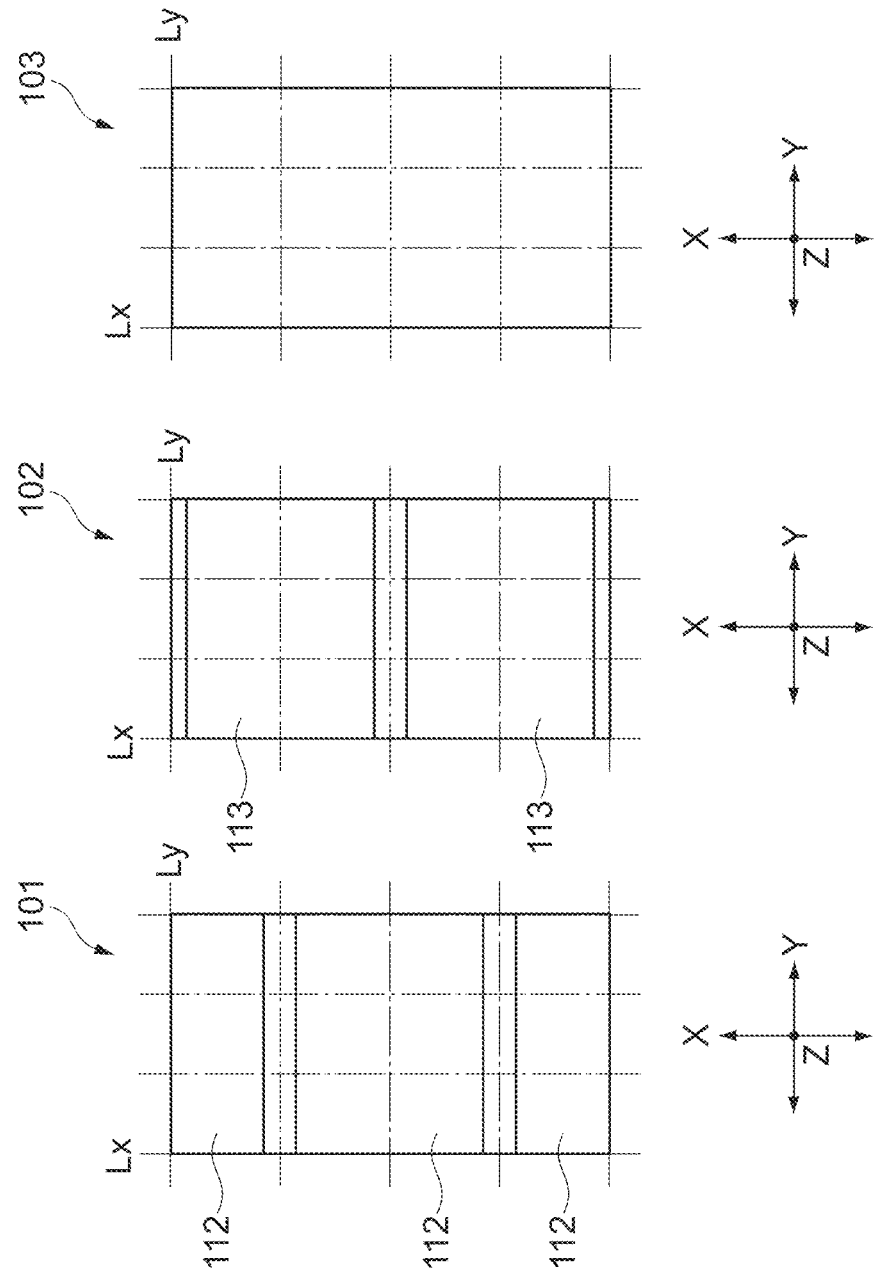
FIGS. 11A, 11B, and 11C are plan views each showing a production process of the multi-layer ceramic capacitor.

FIG. 10 is a flowchart showing a method of producing the multi-layer ceramic capacitor 10. FIGS. 11A to 15 are views each showing a production process of the multi-layer ceramic capacitor 10. Hereinafter, the method of producing the multi-layer ceramic capacitor 10 will be described according to FIG. 10 with reference to FIGS. 11A to 15 as appropriate.

3.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. The thickness of each of the first and second ceramic sheets 101 and 102 is adjusted according to the thickness of the ceramic layer 20 in the capacitance forming unit 18 after sintering. The thickness of the third ceramic sheet 103 can be adjusted as appropriate.

FIGS. 11A, 11B, and 11C are plan views of the first, second, and third ceramic sheets 101, 102, and 103, respectively. At this stage, the first, second, and third ceramic sheets 101, 102, and 103 are not singulated. FIGS. 11A, 11B, and 11C each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 11A, 11B, and 11C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 19.

The first and second internal electrodes 112 and 113 can be formed by applying an optional electrically conductive paste to the first and second ceramic sheets 101 and 102 with a thickness corresponding to the thickness of each of the first and second internal electrodes 12 and 13 in the capacitance forming unit 18 after sintering. For example, for a method of applying an electrically conductive paste, a screen printing method or a gravure printing method can be used.

In the first and second internal electrodes 112 and 113, gaps are disposed in the X-axis direction along the cutting lines Ly for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.2 Step S02: Lamination

Figure 12:
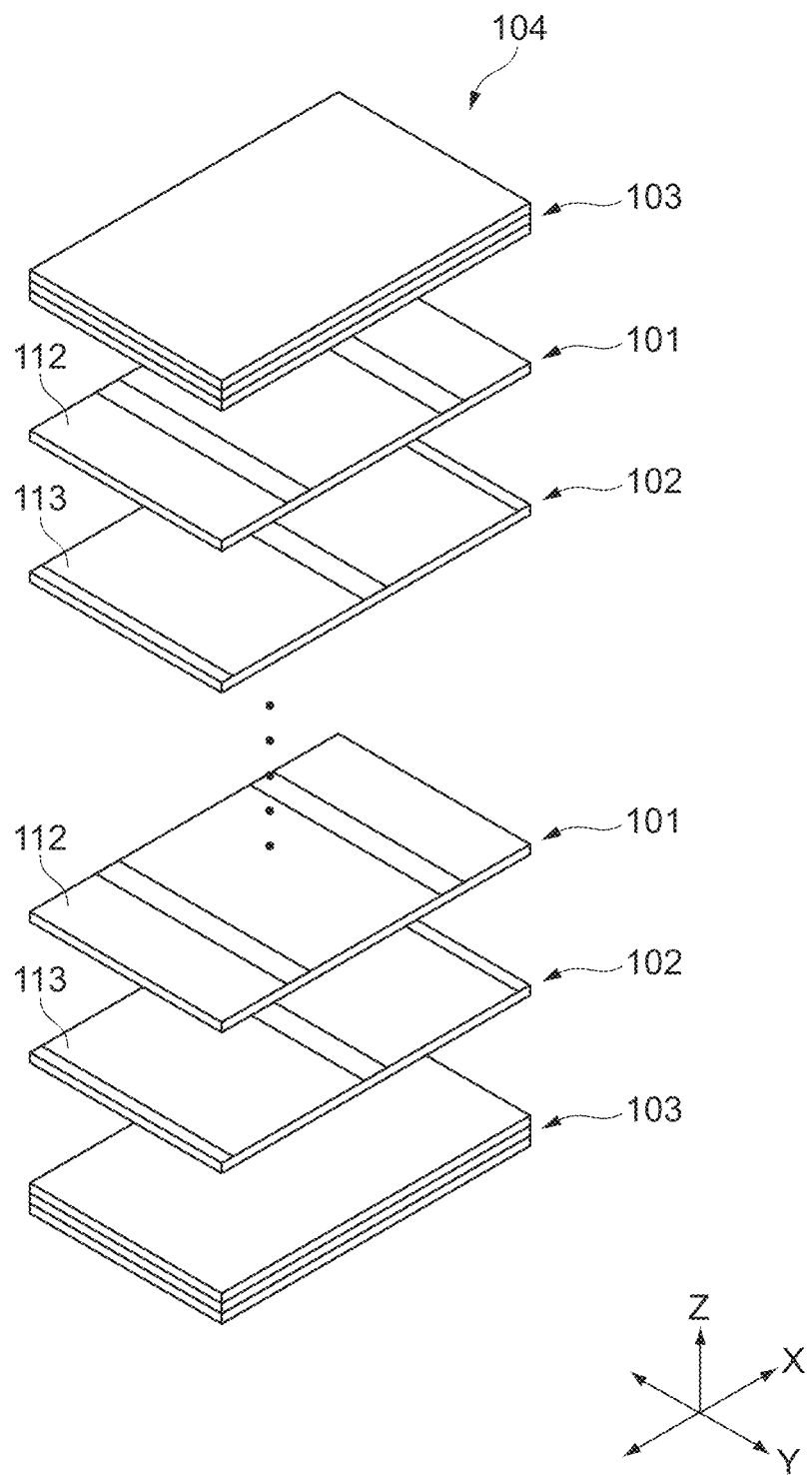
FIG. 12 is a perspective view showing a production process of the multi-layer ceramic capacitor.

In Step S02, the first, second, and third ceramic sheets 101, 102, and 103 prepared in Step S01 are laminated as shown in FIG. 12, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the laminate including the first and second ceramic sheets 101 and 102 alternately laminated in the Z-axis direction. It should be noted that, in the example shown in FIG. 12, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

3.3 Step S03: Cutting

Figure 13:
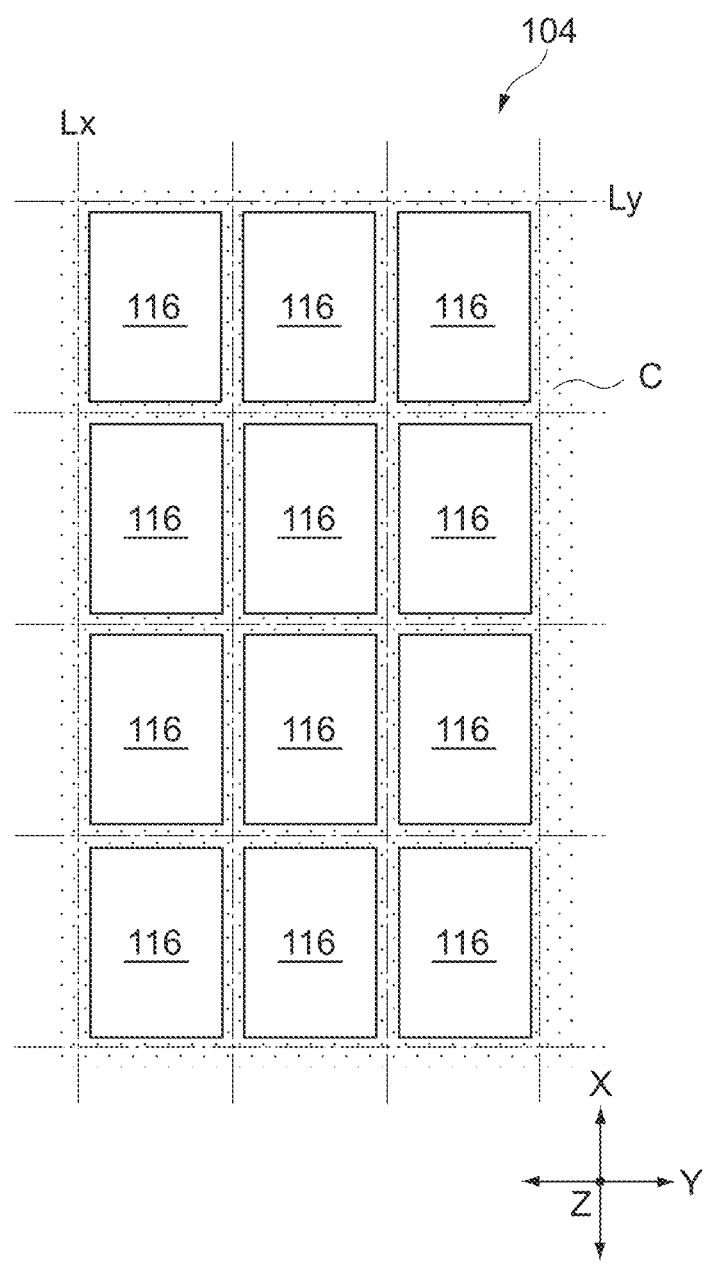
FIG. 13 is a plan view showing a production process of the multi-layer ceramic capacitor.

In Step S03, the multi-layer sheet 104 obtained in Step S02 is cut along the cutting lines Lx and Ly as shown in FIG. 13, to produce unsintered multi-layer units 116. Each of the multi-layer units 116 corresponds to a multi-layer unit 16 after sintering. The multi-layer sheet 104 is cut with a push-cutting blade, a rotary blade, or the like.

More specifically, the multi-layer sheet 104 is cut along the cutting lines Lx and Ly while being held by a holding member C. Thus, the multi-layer sheet 104 is singulated, so that the multi-layer units 116 are obtained. At that time, the holding member C is not cut, and thus the multi-layer units 116 are connected via the holding member C.

Figure 14:
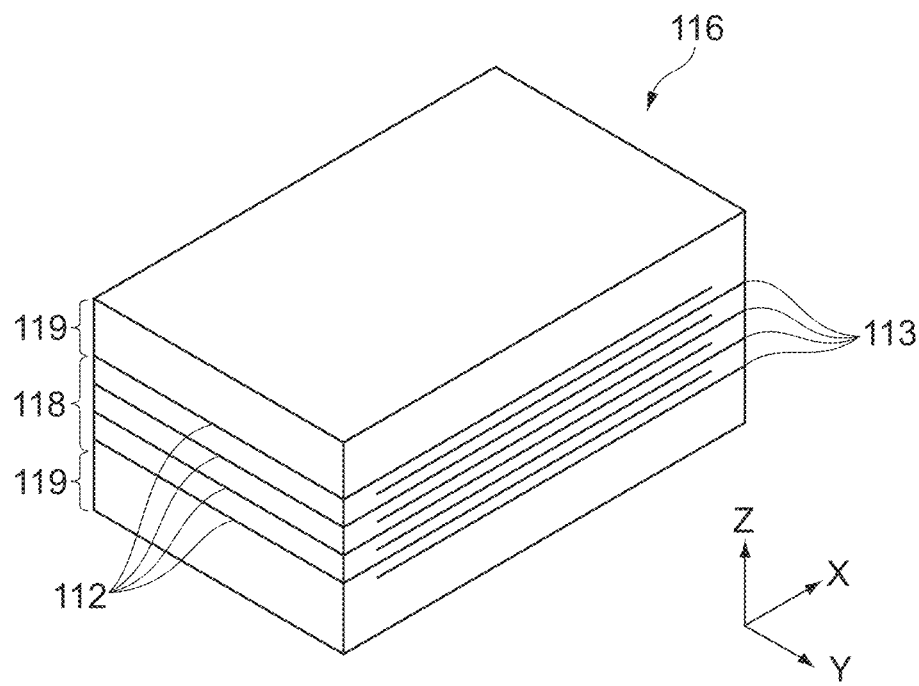
FIG. 14 is a perspective view showing a production process of the multi-layer ceramic capacitor.

FIG. 14 is a perspective view of the multi-layer unit 116 obtained in Step S03. The multi-layer unit 116 includes a capacitance forming unit 118 and covers 119. In the multi-layer chip 116, the first and second internal electrodes 112 and 113 are exposed at the cut surfaces, i.e., both side surfaces. Ceramic layers are formed between the first and second internal electrodes 112 and 113.

3.4 Step S04: Formation of Side Margin

Figure 15:
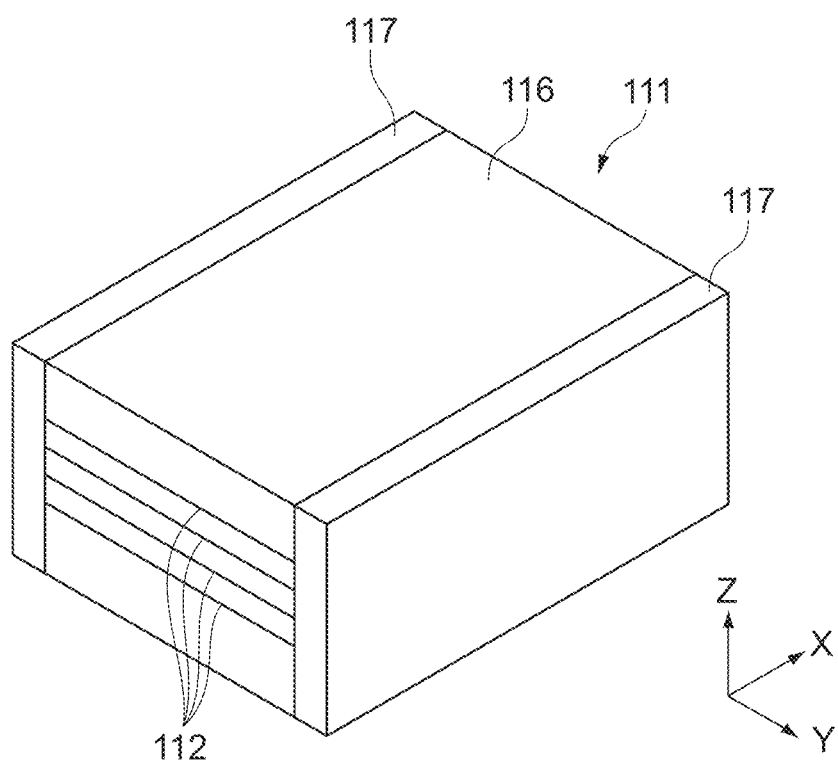
FIG. 15 is a perspective view showing a production process of the multi-layer ceramic capacitor.

In Step S04, unsintered side margins 117 are provided to the side surfaces of the multi-layer unit 116 obtained in Step S03, from which the first and second internal electrodes 112 and 113 are exposed, and an unsintered ceramic body 111 shown in FIG. 15 is thus produced. The side margins 117 are made of a ceramic sheet or ceramic slurry.

In Step S04, the side margins 117 are provided to both the side surfaces that are the cut surfaces of the multi-layer unit 116 in Step S03 and face in the Y-axis direction. Accordingly, in Step S04, it is favorable to previously detach the multi-layer unit 116 from the holding member C and rotate the multi-layer unit 116 by 90 degrees.

The side margins 117 can be formed by, for example, attaching ceramic sheets to the side surfaces of the multi-layer unit 116. Alternately, the side margins 117 can also be formed by coating the side surfaces of the multi-layer unit 116 with ceramic slurry by application or dipping, for example.

The thickness of the side margin 117 is adjusted according to the thickness of the side margin 17 of the ceramic body 11 after sintering. The thickness of the side margin 117 can be adjusted by, for example, the thickness of the ceramic sheet, the number of ceramic sheets, and the viscosity of the ceramic slurry.

3.5 Step S05: Sintering

In Step S05, the unsintered ceramic body 111 obtained in Step S04 is sintered to produce the ceramic body 11 of the multi-layer ceramic capacitor 10 shown in FIGS. 1 to 3. In other words, in Step S05, the multi-layer unit 116 becomes the multi-layer unit 16, and the side margins 117 become the side margins 17.

In Step S05, a sintering condition in which the first crystal grains 21a and the second crystal grains 21b are formed is employed on the basis of the grain growth of the ceramic grains forming the unsintered ceramic body 111. The level of the grain growth of the ceramic grains at the time of sintering can be controlled by, for example, temperature or an atmosphere.

As an example, when a hydrogen concentration of the unsintered ceramic body 111 at the time of sintering is changed, the level of the grain growth of the ceramic grains can be controlled. More specifically, when the hydrogen concentration is raised, the grain growth of the ceramic grains is accelerated, and when the hydrogen concentration is lowered, the grain growth of the ceramic grains is suppressed.

More specifically, a process example for more reliably forming the first crystal grains 21a and the second crystal grains 21b will be described. In this process example, primary sintering mainly for stably accelerating the sintering of the ceramic body 11 and secondary sintering mainly for causing the grain growth of the crystal grains 21 and forming the first crystal grains 21a and the second crystal grains 21b are performed.

In this process example, different sintering conditions are used in the primary sintering and the secondary sintering. Specifically, in the primary sintering, for example, an oxygen partial pressure can be set to $10^{-7}$ Pa, a holding temperature can be set to 1,310° C., and a holding time can be set to 40 minutes. In the secondary sintering, for example, the oxygen partial pressure can be set to $10^{-8}$ Pa, the holding temperature can be set to 1,380° C., and the holding time can be set to 8 minutes.

In this process example, short-time secondary sintering is repeated twice after the primary sintering. Subsequently, the ceramic body 11 is extracted to be observed with the SEM, and the state of the grain growth of the crystal grains 21 is confirmed. In a case where the first crystal grains 21a and the second crystal grains 21b are not sufficiently formed, the secondary sintering of the third time is further performed.

Similarly, while the ceramic body 11 obtained after the secondary sintering is being observed with the SEM, the secondary sintering is repeated until the grain growth of the crystal grains 21 progresses such that the first crystal grains 21a and the second crystal grains 21b are sufficiently formed. This makes it possible to provide the ceramic body 11, in which the first crystal grains 21a and the second crystal grains 21b are sufficiently formed, in this process example.

3.6 Step S06: Formation of External Electrode

In Step S06, the first external electrode 14 and the second external electrode 15 are formed on the ceramic body 11 obtained in Step S05, to produce the multi-layer ceramic capacitor 10 shown in FIGS. 1 to 3. In Step S06, for example, base films, intermediate films, and surface films forming the first and second external electrodes 14 and 15 are formed on the end surfaces of the ceramic body 11 that face in the X-axis direction.

More specifically, in Step S06, first, an unsintered electrode material is applied so as to cover both the end surfaces of the ceramic body 11 that face in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S06 described above may be performed before Step S05. For example, before Step S05, the unsintered electrode material may be applied to both the end surfaces of the unsintered ceramic body 111 that face in the X-axis direction. Thus, in Step S05, sintering of the unsintered ceramic body 111 and baking of the unsintered electrode material can be simultaneously performed.

4. Example

Samples No. 1 to No. 20 of the multi-layer ceramic capacitor 10 were produced by the production method described above. In all of those samples No. 1 to No. 20, the dimension in the X-axis direction was set to 0.6 mm, and the dimensions in the Y- and Z-axis directions were set to 0.3 mm. Further, in all of those samples No. 1 to No. 20, a design capacitance was set to 4.7 µF.

In the samples No. 1 to No. 20, a thickness "a" of the side margin 17, a thickness "b" of the ceramic layer 20, a thickness "c" of each of the first and second internal electrodes 12 and 13, and a diameter "d" of the first crystal grain 21a in the Z-axis direction were variously changed. It should be noted that, in each sample, a crystal grain 21 having the largest diameter in the Z-axis direction in the vicinity of the pores P of the first and second internal electrodes 12 and 13 was set to the first crystal grain 21a.

The thickness "a" of the side margin 17, the thickness "b" of the ceramic layer 20, the thickness "c" of each of the first and second internal electrodes 12 and 13, and the diameter "d" of the first crystal grain 21a in the Z-axis direction in each sample were measured with a photograph of the microstructure of a cross section. It should be noted that the diameter "d" of the first crystal grain 21a in each sample was calculated as a mean value of the diameters of 100 first crystal grains 21a in the Z-axis direction.

Table 1 shows the thickness "a" of the side margin 17, the thickness "b" of the ceramic layer 20, the thickness "c" of each of the first and second internal electrodes 12 and 13, and the diameter "d" of the first crystal grain 21a in the Z-axis direction in the samples No. 1 to No. 20. Further, Table 1 shows a ratio d/b of the diameter "d" of the first crystal grain 21a in the Z-axis direction to the thickness "b" of the ceramic layer 20.

by 15% or more was obtained. In the dielectric breakdown test, a voltage applied to the samples at a temperature of 25° C. was increased, and a voltage at which dielectric breakdown was caused was set as a breakdown voltage (BDV).

As a result, in the samples No. 7 to No. 11 and No. 16 to No. 19, a large breakdown voltage equal to or larger than 27 V was obtained. In particular, in the samples No. 16 to No. 19, a high breakdown voltage was obtained irrespective of the configuration in which the thickness "a" of the side margin 17 was small, 25 μm or smaller, and a large capacitance is obtained, but a structural disorder is easily caused.

Therefore, it is found that a large capacitance and high mechanical strength are obtained in the samples No. 16 to No. 19. This may be because the first crystal grain 21a having an appropriate size is formed and thus the mechanical strength is improved in the samples No. 16 to No. 19.

Meanwhile, in the samples No. 13 to No. 15, the breakdown voltage was less than 27 V. This may be because the grain growth of the first crystal grains 21a is sufficient and

TABLE 1

| Sample | Thickness a of side margin (μm) | Thickness b of ceramic layer (nm) | Thickness c of internal electrode (nm) | Diameter d of first crystal grain (nm) | d/b | Capacitance (μF) | BDV (V) |
|---|---|---|---|---|---|---|---|
| 1 | 17 | 573 | 563 | 85 | 0.1 | 2.98 | — |
| 2 | 18 | 569 | 559 | 220 | 0.4 | 3.01 | — |
| 3 | 17 | 569 | 555 | 566 | 1.0 | 3.01 | — |
| 4 | 17 | 578 | 572 | 703 | 1.2 | 3.02 | — |
| 5 | 17 | 571 | 551 | 958 | 1.7 | 3.04 | — |
| 6 | 18 | 575 | 549 | 1215 | 2.1 | 1.29 | — |
| 7 | 33 | 457 | 455 | 83 | 0.2 | 4.12 | 29 |
| 8 | 31 | 455 | 453 | 206 | 0.5 | 4.15 | 32 |
| 9 | 32 | 452 | 445 | 459 | 1.0 | 4.12 | 31 |
| 10 | 32 | 452 | 440 | 615 | 1.4 | 4.19 | 30 |
| 11 | 34 | 461 | 438 | 819 | 1.8 | 4.11 | 32 |
| 12 | 30 | 459 | 452 | 995 | 2.2 | 2.59 | — |
| 13 | 15 | 460 | 440 | 84 | 0.2 | 4.85 | 12 |
| 14 | 18 | 458 | 463 | 208 | 0.5 | 4.89 | 15 |
| 15 | 18 | 459 | 461 | 449 | 1.0 | 4.87 | 20 |
| 16 | 17 | 462 | 459 | 501 | 1.1 | 4.9 | 29 |
| 17 | 19 | 459 | 460 | 617 | 1.3 | 4.87 | 27 |
| 18 | 18 | 463 | 459 | 736 | 1.6 | 4.86 | 28 |
| 19 | 16 | 461 | 451 | 831 | 1.8 | 4.83 | 31 |
| 20 | 19 | 459 | 449 | 982 | 2.1 | 2.35 | — |

First, an electrostatic capacitance was measured for the samples No. 1 to No. 20. In the samples No. 13 to No. 19, a large electrostatic capacitance exceeding 4.7 μF as the design capacitance was obtained. On the other hand, in the samples No. 1 to No. 6 in which the thickness "b" of the ceramic layer 20 and the thickness "c" of each of the first and second internal electrodes 12 and 13 each exceed 500 nm, an electrostatic capacitance smaller than the design capacitance by 15% or more was obtained.

Further, in the samples No. 7 to No. 11 in which the thickness "a" of the side margin 17 exceeds 25 μm, an electrostatic capacitance slightly smaller than the design capacitance was obtained. Moreover, in the samples No. 6, No. 12, and No. 20 in which the diameter "d" of the first crystal grain 21a in the Z-axis direction is equal to or larger than twice of the thickness "b" of the ceramic layer 20, an electrostatic capacitance smaller than the design capacitance by 15% or more was obtained.

Next, a dielectric breakdown test was performed on the samples No. 7 to No. 11 and No. 13 to No. 19 excluding the samples No. 1 to No. 6, No. 12, and No. 20 in which an electrostatic capacitance smaller than the design capacitance the first crystal grains 21a insufficiently enter the pores P of the first and second internal electrodes 12 and 13 in the samples No. 13 to No. 15.

5. Other Embodiments

Hereinabove, the embodiment of the present disclosure has been described, but the present disclosure is not limited to the embodiment described above and can be variously modified as a matter of course.

For example, in the multi-layer ceramic capacitor 10, the capacitance forming unit 18 may be divided into multiple capacitance forming units 18 in the Z-axis direction. In this case, in each capacitance forming unit 18, the first internal electrodes 12 and the second internal electrodes 13 only need to be alternately disposed along the Z-axis direction. In a portion where the capacitance forming units 18 are next to each other, the first internal electrodes 12 or the second internal electrodes 13 may be continuously disposed.

Further, in the embodiment described above, the multi-layer ceramic capacitor 10 has been described as an example of a multi-layer ceramic electronic component, but the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
   a plurality of layered internal electrodes that are disposed at intervals in a first direction, each internal electrode of the plurality of layered internal electrodes including a pore penetrating through the respective internal electrode in the first direction;
   a side margin that covers the plurality of layered internal electrodes in a second direction orthogonal to the first direction; and
   a first crystal grain existing at a boundary portion between the plurality of layered internal electrodes and the side margin, the first crystal grain having a larger diameter in the first direction than the interval and having a part disposed in the pore of a first internal electrode of the plurality of layered internal electrodes,
   wherein each layered internal electrode of the plurality of layered internal electrodes comprises an end portion and extends in the second direction to its respective end portion, and
   wherein the end portions of the layered internal electrodes are aligned with each other in the first direction.

2. The multi-layer ceramic electronic component according to claim 1, wherein the plurality of layered internal electrodes comprises:
   a second internal electrode adjacent to the first internal electrode in the first direction and disposed above the first internal electrode in the first direction; and
   a third internal electrode adjacent to the first internal electrode in the first direction and disposed below the first internal electrode in the first direction,
   wherein the first internal electrode is connected to the second internal electrode by the first crystal grain, the first crystal grain being in direct contact with both the first internal electrode and the second internal electrode, and
   wherein the first internal electrode is connected to the third internal electrode by a second crystal grain disposed in the pore in the first internal electrode, the second crystal grain being in direct contact with both the first internal electrode and the third internal electrode.

3. The multi-layer ceramic electronic component according to claim 1, wherein
   the pore includes a pore including a void forming a space that is not filled with the crystal grain.

4. The multi-layer ceramic electronic component according to claim 1, wherein
   the first crystal grain has a diameter in the first direction that is smaller than twice the interval.

5. The multi-layer ceramic electronic component according to claim 1, further comprising
   a second crystal grain that directly connects two layers adjacent to each other in the first direction out of the plurality of layered internal electrodes.

6. The multi-layer ceramic electronic component according to claim 1, wherein
   the side margin has a dimension in the second direction that is equal to or smaller than 25 µm.

7. The multi-layer ceramic electronic component according to claim 1, wherein
   the interval is equal to or smaller than 500 nm.

8. The multi-layer ceramic electronic component according to claim 1, wherein
   the plurality of layered internal electrodes each has a dimension in the first direction that is equal to or smaller than 500 nm.

* * * * *